United States Patent [19]

Wehde

[11] 4,340,261
[45] Jul. 20, 1982

[54] MAGNETIC BEARING ARRANGEMENT

[75] Inventor: Heinz Wehde, Rothenberg, Fed. Rep. of Germany

[73] Assignee: Teldix GmbH, Heidelberg, Fed. Rep. of Germany

[21] Appl. No.: 191,243

[22] PCT Filed: Apr. 25, 1979

[86] PCT No.: PCT/DE79/00047
  § 371 Date: Dec. 21, 1979
  § 102(e) Date: Dec. 21, 1979

[87] PCT Pub. No.: WO79/00987
  PCT Pub. Date: Nov. 29, 1979

[30] Foreign Application Priority Data

Apr. 26, 1978 [DE] Fed. Rep. of Germany ....... 2818255

[51] Int. Cl.³ .............................................. F16C 39/00
[52] U.S. Cl. ...................................................... 308/10
[58] Field of Search ........................................... 308/10

[56] References Cited

U.S. PATENT DOCUMENTS

| 3,216,349 | 11/1965 | Kraft | 308/10 |
| 3,791,704 | 2/1974 | Perper | 308/10 |
| 3,860,300 | 1/1975 | Lyman | 308/10 |
| 3,958,842 | 5/1976 | Telle | 308/10 |
| 4,043,614 | 8/1977 | Lyman | 308/10 |
| 4,065,189 | 12/1977 | Sikorra | 308/10 |
| 4,072,370 | 2/1978 | Wasson | 308/10 |

FOREIGN PATENT DOCUMENTS

| 2341766 | 2/1975 | Fed. Rep. of Germany | 308/10 |
| 2309754 | 11/1976 | France | 308/10 |

Primary Examiner—R. Skudy
Attorney, Agent, or Firm—Spencer & Kaye

[57] ABSTRACT

A magnet bearing arrangement comprising a stator and a rotor disposed within the stator. A first set of adjacent annular permanent magnet members is secured to the surface of the rotor and a second set of adjacent annular permanent magnet members is secured to the inner surface of the stator, the first and second sets of permanent magnet members being arranged in axial juxtaposition so as to generate repelling magnetic forces that stabilize movement of the rotor in the radial direction. A plurality of annular windings are positioned on the stator adjacent the second set of permanent magnet members for generating a magnetic force in response to a sensor for stabilizing axial movement of the rotor.

8 Claims, 1 Drawing Figure

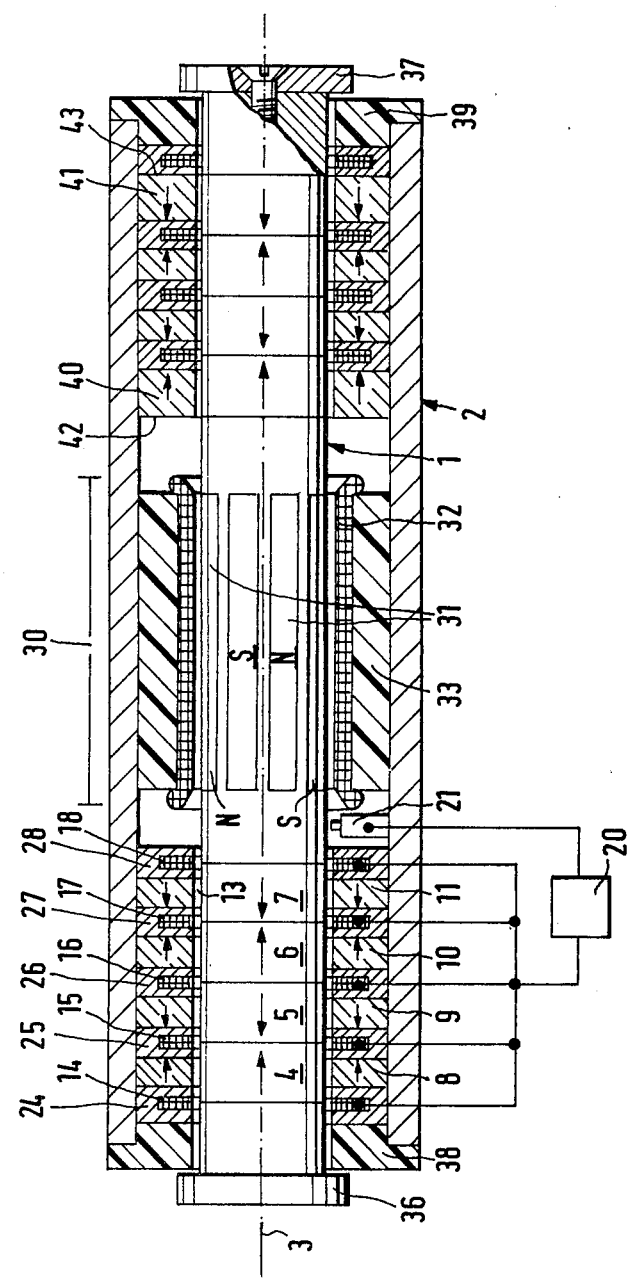

MAGNETIC BEARING ARRANGEMENT

The invention relates to a magnetic bearing arrangement known from German Offenlegungsschrift No. 2,341,766 and including a rotor and a stator each provided with a ring or disc shaped permanent magnet with repulsive magnetic bearing forces being active between the rotor and the stator. Due to the essentially radially directed magnetization of the permanent magnet rings in the known bearing arrangement, the rotor is passively stabilized in the radial direction. However, in the direction perpendicular to the direction of magnetization, i.e., in the axial direction, there then occur destabilizing forces. For that reason, an electromagnetic control device with toroidal windings and further permanent magnet rings is provided to stabilize the rotor in the axial direction. It has been found that such an arrangement requires a considerable amount of space as well as high expenditures for the permanent magnet rings. Moreover, the manufacture of such an arrangement provides difficult since the toroidal windings and permanent magnets providing the axial stabilization must be aligned with great precision with respect to the permanent magnet rings providing the radial stabilization.

It is therefore the object of the invention to avoid the above-mentioned difficulties by providing a magnetic bearing arrangement which is of simple design and can be produced at low cost.

The magnetic bearing arrangement according to the invention is distinguished by simple design and optimum utilization of the provided magnetic material, i.e., the permanent magnet rings. It is of particular significance that the integration of toroidal windings and permanent magnet rings has created a compact bearing arrangement which is closed on itself and which effects the passive stabilization of the rotor, for example in the radial direction, as well as the controlled active stabilization in the axial direction. The toroidal windings are preferably arranged between the permanent magnet rings on the side of the stator so that the permanent magnet rings on the side of the rotor simultaneously coact with the toroidal windings and the permanent magnet rings. Due to the spatial combination of permanent magnet rings and toroidal windings, separate and complicated installation or alignment, respectively, as it is necessary with the prior art arrangement, is no longer required.

According to a preferred embodiment, axially magnetized permanent magnet rings are provided for an arrangement having an axial annular air gap, the axially juxtaposed permanent magnet rings each being magnetized in opposite directions. Such magnet rings can be manufactured very easily. In an advantageous modification, the toroidal windings are surrounded by U-shaped rings of soft iron, thus realizing favorable guidance for the magnetic field lines. Such use has been found to be of particular advantage in an elongate rotor, especially in the area of each of the rotor ends. Such a rotor which is designed, in particular, to serve as a spindle in the spinning industry or as a spinning rotor in an open-end spinning machine, rotates about its major axis of inertia so that the bearing forces to be generated are comparatively low even if there is an imbalance. Moreover, mechanical abutments are provided to prevent the rotor from being brought too far out of its desired position by the destabilizing magnetic forces. These abutments also serve as emergency bearings which prevent damage when the toroidal winding is switched off. It must be emphasized that permanent magnet rings are understood to include not only closed rings but also arrangements made of individual segments. The permanent magnet rings are preferably made of a ferroplastic material in which small particles having hard magnetic properties are present in uniform distribution in a plastic. The invention relates to arrangements in which the rotor is designed as an internal rotor or as an external rotor.

The invention will be described in detail herebelow with the aid of an embodiment that is illustrated in the drawing.

The basic illustration shows an elongate rotor 1 which is disposed within a stator 2 to be rotatable about an axis 3. Essentially corresponding magnetic bearing arrangements including a set of permanent magnet rings 4–7 arranged on the rotor 1 are provided at both ends of the rotor. The permanent magnet rings 4–7 which may also be designed as discs, are each magnetized in the direction of axis 3, the respectively adjacently disposed rings having opposite directions of magnetization as indicated by the arrows. A set of permanent magnet rings 8–11, which are magnetized in the axial direction like the rings of rotor 1, are provided on the stator 2 leaving an axial annular air gap 13.

In the illustrated desired position of rotor 1, the narrower permanent magnet rings 8–11 are each disposed in the same radial plane as the associated permanent magnet rings 4–7 with their centers being flush with one another. Due to the above-mentioned magnetization, the magnetic field lines in the air gap 13 extend essentially in the radial direction in the area of the contacting faces of the permanent magnet rings 4–7. Since the permanent magnet rings 8–11 are likewise magnetized in the same manner, the rotor 1 is passively stabilized in the radial direction by the repulsive magnetic forces. It can be seen that destabilizing forces in the axial direction become effective on the rotor 1 if the rotor deviates from the desired position. Therefore electrical toroidal windings 14–18 are provided on the stator 2 next to or between, respectively, the permanent magnet rings 8–11. These toroidal windings are energized by means of a known control device 20 in dependence on the deviation of the rotor 1 from the desired position. The desired position of the rotor 1 or the deviation of the rotor from the same, respectively, is detected by means of a sensor 21 secured within the stator 2. If due to extraneous forces, the rotor 1 is deflected from the desired position, for example toward the right in the drawing, a signal from the sensor 21 which is connected to the control device 20, causes the control device 20 to send current through the toroidal windings 14–18 in such a manner that, in cooperation with the permanent magnet rings 4–7, a force component acts on the rotor toward the left in the direction of the axis of rotation 3 until the rotor 1 has regained the desired position. It has been found that only a very small amount of electrical energy need be consumed to keep the rotor 1 in the desired position.

The toroidal windings 14–18 are preferably arranged in U-shaped rings 24–28 of soft iron which are open toward the air gap or toward the rotor 1, respectively. Thus, the magnetic flux from the permanent magnet rings or from the toroidal windings is guided advantageously or the magnetic resistance of the magnetic circuits is reduced, respectively.

As already mentioned above, a corresponding bearing arrangement is provided at the other end of the rotor. An electrical drive motor 30 is provided in the center and includes on the rotor circumference a number of radially magnetized permanent magnet rings 31 with polarities that alternate in the circumferential direction. A multiphase drive coil 32 which is inserted in an iron-free stator body 33 is provided on the stator 2. Such an iron-free drive motor 30 is of particular advantage in conjunction with the described magnetic bearing arrangement since in addition to the required driving torque practically no further forces act on the rotor 1 which would otherwise have to be additionally absorbed by the magnetic bearing arrangement.

In order for the rotor 1 not to be deflected too far out of the desired position, particularly in the axial direction, the rotor is provided with a flange 36 and a removable disc 37 at its ends. These have associated rings 38, 39 disposed on the stator 2 and forming small annular gaps so that the thus formed abutments limit the movement of the rotor 1. Instead of the flange 36, a preferred embodiment provides the spinning rotor of an open-end spinning machine. For rings 38, 39, a material having good sliding properties, such as Teflon for example, is provided so that an additional emergency bearing is created for the rotor 1 and damage is avoided even if, due to malfunctions or during startup, no current flows in windings 14–18. Such abutments may possibly also be provided only at one rotor end, rotor movement being limited in both directions by appropriate design.

The bearing arrangement at the right-hand rotor and in the drawing essentially corresponds to the arrangement described in detail above so that hereinafter only the differences will be explained. The two outer permanent magnet rings 40, 41 are made thicker in the axial direction in such a way that the outer frontal faces 42, 43 each lie in the same radial plane as those of the associated permanent magnet rings of the rotor 1. In this way, the magnetic volume is increased and the field lines extend into said region in a favorable manner.

The embodiment explained with the aid of the drawing includes a magnetic bearing arrangement at either end of an elongate rotor, an axial annular air gap being provided at each end. It is pointed out that the invention is not limited to such an arrangement but that with a correspondingly designed rotor a single such bearing arrangement may also be provided. The invention further relates to arrangements which each include only one permanent magnet on the stator or rotor, respectively. The decisive fact is that additionally at least one electrical winding is provided particularly on the stator in order to generate, together with the other permanent magnet, a controllable force component which acts on the rotor in the axial direction.

I claim:

1. A magnetic bearing arrangement comprising:
   an elongated hollow cylindrical stator having an inner surface and a longitudinal axis;
   an elongated rotor having an outer circumferential surface separated from the inner surface of said stator by an annular air gap, said rotor being disposed within said stator for rotation about said longitudinal axis;
   a first set of adjacent annular permanent magnet members secured to the circumferential surface of said rotor, said permanent magnet members being axially distributed along said rotor;
   a second set of adjacent annular permanent magnet members secured to the inner surface of said stator, each of said second set of annular permanent magnet members being arranged in axial juxtaposition with a corresponding member of said first set so as to generate repelling magnetic forces for stabilizing movement of said rotor in a radial plane transverse to said longitudinal axis;
   a plurality of annular windings, one of said windings being interposed between adjacent permanent magnet members of said second set;
   a sensor located within said stator and adjacent said rotor for monitoring the axial position thereof; and
   a control device coupling the output of said sensor to said plurality of annular windings for controlling the current through said windings in accordance with the deviation of said rotor from a predetermined position, said annular windings generating a magnetic force for stabilizing movement of said rotor in the axial direction.

2. A magnetic bearing arrangement according to claim 1 wherein said plurality of annular windings further includes annular windings located adjacent only the permanent magnet members at the ends of said second set of said members.

3. A magnetic bearing arrangement according to claim 1 or 2 wherein each of the permanent magnet members comprising said first and second sets is magnetized in the axial direction, corresponding permanent magnet members of said first and second sets having the same direction of magnetization.

4. A magnetic bearing arrangement according to claim 1 or 2 which further comprises a plurality of magnetic rings enclosing each of the windings of said plurality of annular windings, said rings having a U-shaped profile open toward said rotor.

5. A magnetic bearing arrangement according to claim 1 or 2 wherein said plurality of annular windings and said first and second sets of adjacent annular permanent magnet members are provided at each end of said rotor and stator respectively.

6. A magnetic bearing arrangement according to claim 1 or 2 wherein all of the permanent magnet members of said second set have the same width in the axial direction, each member of said second set being arranged symmetrically with respect to a radial plane through the center of the corresponding member of said first set.

7. A magnetic bearing arrangement according to claim 1 or 2 which further comprises a flanged member at each end of said rotor and a ring at each end of said stator, said flanged member and ring cooperating to serve as an emergency bearing in the axial direction.

8. A magnetic bearing arrangement according to claim 1 or 2 wherein said first and second sets of permanent magnet rings are composed of a ferroplastic material wherein small magnetic particles are uniformly distributed within a plastic.

* * * * *